(12) United States Patent
Chen

(10) Patent No.: US 12,137,201 B1
(45) Date of Patent: Nov. 5, 2024

(54) NAKED-EYE THREE-DIMENSIONAL VR CAMERA

(71) Applicant: Shenzhen Gaodi Digital Co., Ltd., Guangdong (CN)

(72) Inventor: Zhujun Chen, Guangdong (CN)

(73) Assignee: Shenzhen Gaodi Digital Co., Ltd., Guangdong (CN)

( * ) Notice: Subject to any disclaimer, the term of this patent is extended or adjusted under 35 U.S.C. 154(b) by 0 days.

(21) Appl. No.: 18/676,069

(22) Filed: May 28, 2024

(30) Foreign Application Priority Data

Mar. 20, 2024 (CN) .......................... 202420551938.1

(51) Int. Cl.
| | |
|---|---|
| *H04N 13/156* | (2018.01) |
| *H04N 13/239* | (2018.01) |
| *H04N 13/296* | (2018.01) |
| *H04N 13/344* | (2018.01) |
| *H04N 13/398* | (2018.01) |
| *H04R 1/02* | (2006.01) |

(52) U.S. Cl.
CPC ......... *H04N 13/156* (2018.05); *H04N 13/239* (2018.05); *H04N 13/296* (2018.05); *H04N 13/344* (2018.05); *H04N 13/398* (2018.05); *H04R 1/028* (2013.01); *H04R 2499/11* (2013.01); *H04R 2499/15* (2013.01)

(58) Field of Classification Search
None
See application file for complete search history.

(56) References Cited

U.S. PATENT DOCUMENTS

2017/0054969 A1* 2/2017 Lu .......................... G02B 30/35

* cited by examiner

*Primary Examiner* — Christopher Braniff

(57) ABSTRACT

A naked-eye three-dimensional VR camera includes a first lens module and a second lens module arranged at intervals of a pupil distance to simulate human eyes and form a pupil distance difference between captured first and second images. When the first image through one eye and the second image through the other eye are observed from the display component through eyepiece member, a naked-eye three-dimensional effect can be directly formed. A montage module is connected to a control member or a memory card assembly to read files of the first and second images, and splice the first and second images according to a time axis. Because the first and second images are synchronously captured, so that the first and second images are combined to form a three-dimensional image file with the pupil distance difference, thereby playing the captured images on other naked-eye three-dimensional devices (such as VR glasses, VR helmets).

17 Claims, 5 Drawing Sheets

NAKED-EYE THREE-DIMENSIONAL VR CAMERA

CROSS-REFERENCE TO RELATED APPLICATION

This application claims priority to Chinese Patent Application No. 202420551938.1, titled "NAKED-EYE THREE-DIMENSIONAL VR CAMERA" and filed to the China National Intellectual Property Administration on Mar. 20, 2024, the entire contents of which are incorporated herein by reference.

TECHNICAL FIELD

The present disclosure relates to the field of naked-eye three-dimensional VR technologies, and especially relates to a naked-eye three-dimensional VR camera.

BACKGROUND

A Conventional night vision device is configured to observe two-dimensional (2D) images, and as demands for image viewing increase, more and more consumers prefer three-dimensional images. A conventional three-dimensional (3D) technology is usually used on VR glasses and VR helmets, which can only play pre-made videos and can't directly display images in a three-dimensional way that are captured by lens. With the development of technologies, some three-dimensional cameras have also emerged, but on one hand, the three-dimensional cameras have no night vision functions, and on the other hand, the three-dimensional cameras can only display the captured images in the three-dimensional way through optical transformation modes, and files that are stored are still ordinary two-dimensional images.

SUMMARY

The technical problems to be solved: in view of the shortcomings of the related art, an objective of the present disclosure is to provide a naked-eye three-dimensional VR camera which can view in a three-dimensional effect and capture files of three-dimensional images.

To achieve the above objective, a naked-eye three-dimensional VR camera according to an embodiment of the present disclosure includes:
a lens module including a first lens and a second lens arranged at intervals according to a pupil distance thereof, and a supplementary light module; the first lens module configured to capture a first image or cooperatively combined with the supplementary light module to capture the first image, the second lens module configured to capture a second image or cooperatively combined with the supplementary light module to capture the second image, and both the first lens module and the second lens module operated synchronously;
a control member electrically connected to each of the first lens module, the second lens module and the supplementary light module;
a memory card assembly electrically connected to the control member;
an observation module including a display component, an observation member and an eyepiece member sequentially connected, the control member configured to control the display component to display the first image and the second image side by side, the eyepiece member configured to observe the first image and the second image through the observation member, to form a naked-eye three-dimensional effect thereof; and wherein
the naked-eye three-dimensional VR camera further includes a montage module installed inside the naked-eye three-dimensional VR camera or outside the naked-eye three-dimensional VR camera, the montage module configured to perform data analysis and comparison on the first image and the second image according to a file name, a format and a time axis, and then splice the first image and the second image that has been analyzed and compared side by side to form a three-dimensional image file with a pupil distance disparity; wherein the memory card assembly is configured to store the first image and the second image or store the three-dimensional image file that has been spliced.

The present disclosure provides the advantages as below: the present disclosure provides that the first lens module and the second lens module are arranged according to the pupil distance thereof to simulate human eyes, so that the first and second images that are captured form a pupil distance difference therebetween. When the first image through one eye and the second image through the other eye are observed from the display component through the eyepiece member, a naked-eye three-dimensional effect can be directly formed. Furthermore, the montage module is connected to the control member or the memory card assembly to read the files of the first and second images and splice the first and second images according to the time axis. Since the first and second images are captured synchronously, so that a three-dimensional image file with the pupil distance difference can be obtained after the first and second images are spliced, thereby the captured images can be played on other naked-eye three-dimensional devices (such as VR glasses, VR helmets).

DETAILED DESCRIPTION

In order to more clearly understand the technical solution hereinafter in embodiments of the present disclosure, a naked-eye three-dimensional VR camera of the present disclosure will now be made in detail to embodiments, examples of which are illustrated in the accompanying drawings. It should also be understood that the terms used in the specification of the present disclosure are only for the purpose of describing specific embodiments without being intended to limit the present disclosure.

A First Embodiment of the Present Disclosure

Figure 1:
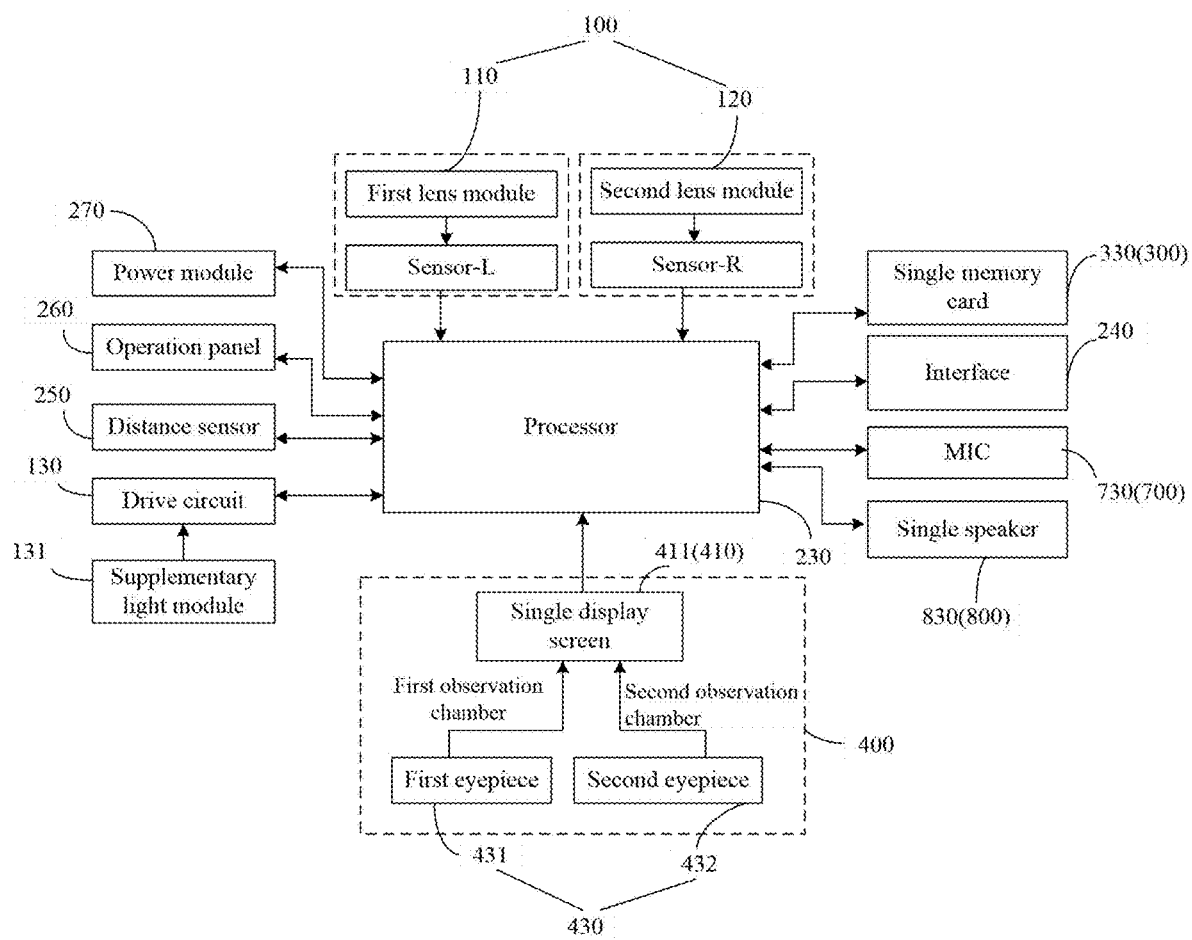
FIG. 1 is a schematic view of a naked-eye three-dimensional VR camera in accordance with a first embodiment of the present disclosure.

Referring to FIG. 1, a naked-eye three-dimensional VR camera in accordance with an embodiment of the present disclosure includes:

a lens module 100 including a first lens lens 110, a second lens 120 and a supplementary light module 130, both the first lens 110 and the second lens 120 arranged at intervals according to a pupil distance thereof; the first lens module 110 configured to capture a first image 610 or cooperatively combined with the supplementary light module 130 to capture the first image 610, the second lens module 120 configured to capture a second image 620 or cooperatively combined with the supplementary light module 130 to capture the second image 620, and both the first lens module 110 and the second lens module 120 operated synchronously. It can be understood that when light is sufficient, the supplementary light module 130 does not need to be activated. When the light is insufficient and a night vision mode needs to be activated, the supplementary light module 130 is activated. The supplementary light module 130 is typically arranged between the first lens module 110 and the second lens module 120. All of the first lens module 110, the second lens module 120 and the supplementary light module 130 can be arranged along the same direction. It is understandable that the supplementary light module 130 can be a dim light lamp or an infrared lamp according to actual requirements, so as to cooperate with the first lens module 110 and the second lens module 120 for performing night vision shooting.

Referring to FIG. 1, the control member 200 is a single processor 230, and the memory card assembly 300 is a single memory card 330. The single processor 230 is also connected to all of a power module 270, an operation panel 260, a distance sensor 250, an interface 240, a single microphone (MIC) 730, a single speaker 830, the first lens module 110 and the second lens module 120. The supplementary light module 130 is connected to the single processor 230 through a drive circuit 131.

Referring to FIG. 1, the observation module 400 includes a display component 410, an observation member 420 and eyepiece member 430 sequentially connected. The display component 410 is a single display screen 411, and the eyepiece member 430 includes a first eyepiece 431 and a second eyepiece 432. The observation member 420 includes a first observation chamber 421 and a second observation chamber 422 that are isolated from each other. The single display screen 411 is electrically connected to the single processor 230 and configured to display the first image 610 and the second image 620 side by side under a control line of the single processor 230. The first eyepiece 431 is configured to observe the first image 610 through the first observation chamber 421, and the second eyepiece 432 is configured to observe the second image 620 through the second observation chamber 422.

Figure 7:
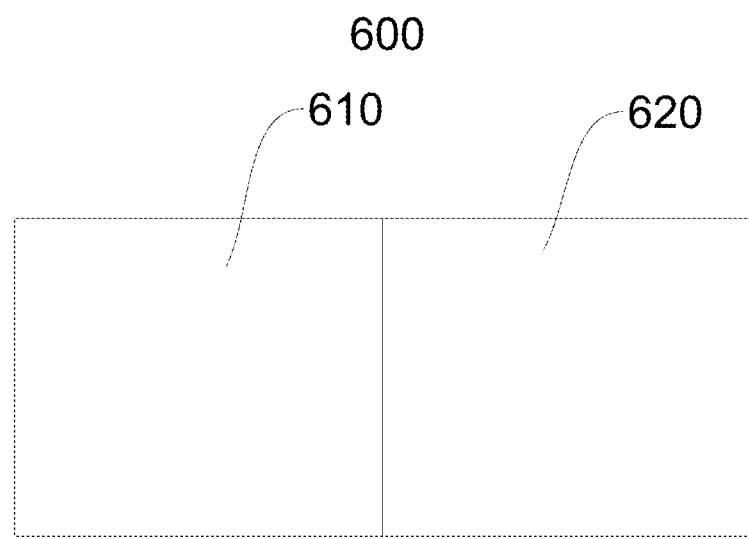
FIG. 7 is a schematic view of a three-dimensional image that is synthesized by a splicing mode of the naked-eye three-dimensional VR camera of the present disclosure.

Referring to FIG. 1 and FIG. 7, the montage module 500 is built-in and directly coupled to the single processor 230; alternatively, the montage module 500 is coupled to a chip that is electrically connected to the single processor 230. The montage module 500 is configured to perform data analysis and comparison on the first image 610 and the second image 620 according to a file name, a format and a time axis, and then splice the first image and the second image that has been analyzed and compared side by side to form a three-dimensional image file with a pupil distance disparity, so that the three-dimensional image file that has been spliced are stored in a single memory card 330. For example, a file storage name of the first image 610 is a first picture, with a format of mp4, a starting time of 2024-01-02-01-23-23' and a completion time of 2024-01-02-45-50-50', and a file storage name of the second image 620 is a second picture, with a format of mp4, a starting time of 2024-01-01-23-23' and a completion time of 2024-01-02-45-50-50', with corresponding file names, the same formats and the same starting times, the two files are spliced according to the time axis, that is, two images with the same time are spliced. If the completion times are not consistent, the two pictures can not to be spliced. A a shorter one between the two completion times can be taken as a benchmark to delete remaining images of the picture with a longer one between the two completion times.

The three-dimensional image files that have been spliced are stored in the single memory card 330, so that users can choose the files that are stored to be played directly through the single display screen 411 for viewing. Alternatively, referring to FIG. 6, and the memory card can be removed and placed in other similar devices (VR glasses, VR helmets) for viewing.

Preferably, the memory card assembly 300 can be a TF card.

The first lens module 110 and the second lens module 120 are arranged at intervals of a pupil distance to simulate human eyes and form a pupil distance difference between the first image 610 and the second image 620 that are captured. When the first image 610 through one eye and the second image 620 through the other eye are observed from the display component 410 through the eyepiece member 430, a naked-eye three-dimensional effect can be directly formed. The montage module 500 is connected to the control member 200 or the memory card assembly 300 to read files of the first and second images 610, 620, and splice the first and second images 610, 620 according to a time axis. Because the first and second images 610, 620 are synchronously captured, so that the first and second images 610, 620 are combined to form a three-dimensional image file with the pupil distance difference, thereby the captured images can be played on other naked-eye three-dimensional devices (such as VR glasses, VR helmets).

A Second Embodiment of the Present Disclosure

Figure 2:
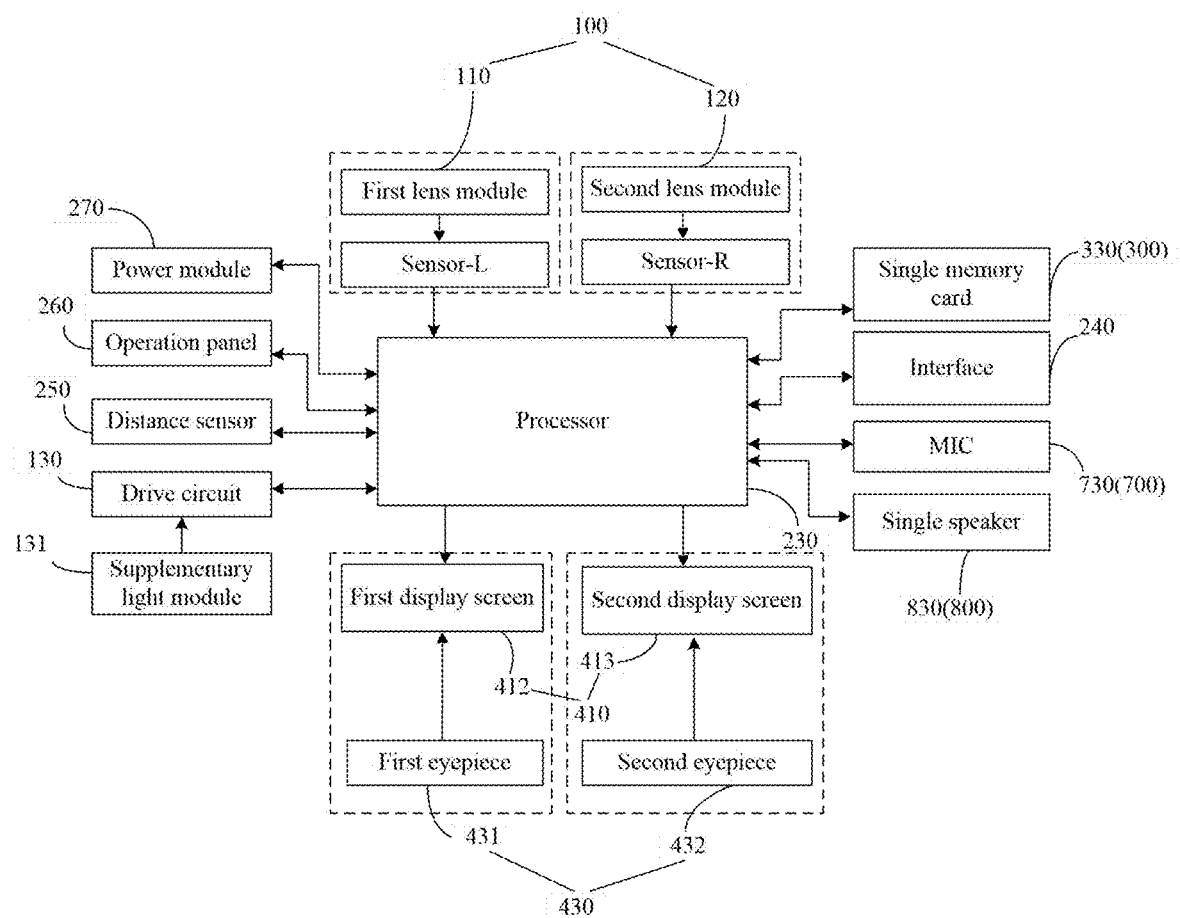
FIG. 2 is a schematic view of a naked-eye three-dimensional VR camera in accordance with a second embodiment of the present disclosure.

Referring to FIG. 2, a difference between the second embodiment and the first embodiment is that the display component 410 is dual displays, that is, a first display screen 412 and a second display screen 413.

Under a control of the single processor 230, the first display screen 412 is configured to display the first image 610, and the second display screen 413 is configured to display the second image 620. As long as the first image 610 and the second image 620 are displayed side by side and enter a left eye and a right eye of the human eye respectively, the display screen can be a single display or a double display according to actual needs, both of which can be viewed by a naked-eye three-dimensional mode.

A microphone (MIC) member 700 can be dual microphones, namely a first microphone 710 and a second microphone 720. A speaker assembly 800 is dual speakers, namely a first speaker 810 and a second speaker 820. All of the first microphone 710, the second microphone 720, the first speaker 810 and the second speaker 820 are electrically connected to the single processor 230.

A Third Embodiment of the Present Disclosure

Figure 3:
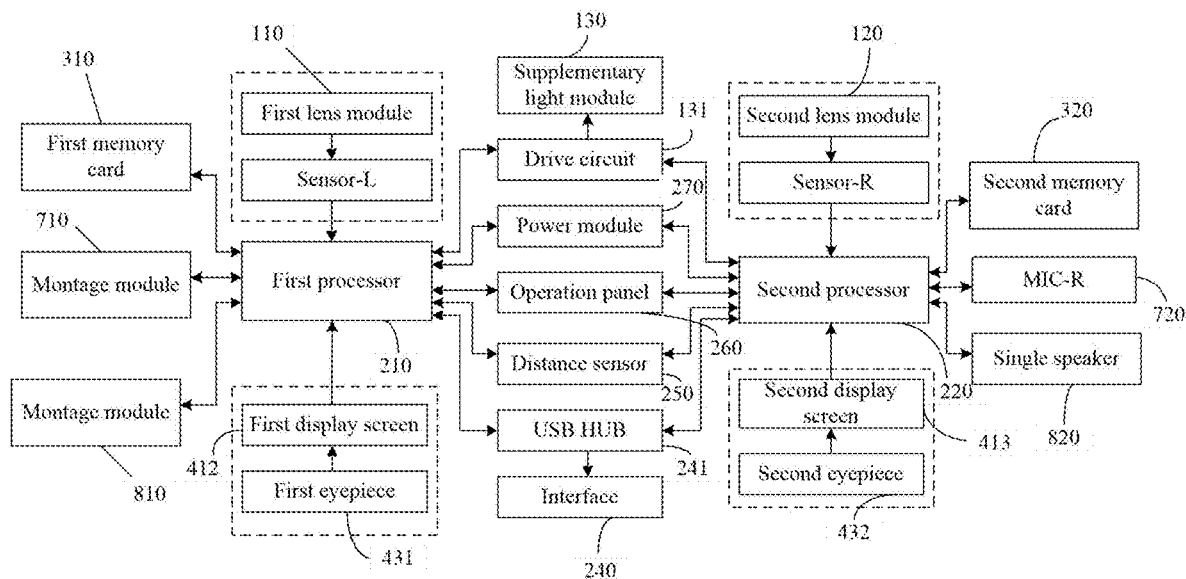
FIG. 3 is a schematic view of a naked-eye three-dimensional VR camera in accordance with a third embodiment of the present disclosure.
Figure 4:
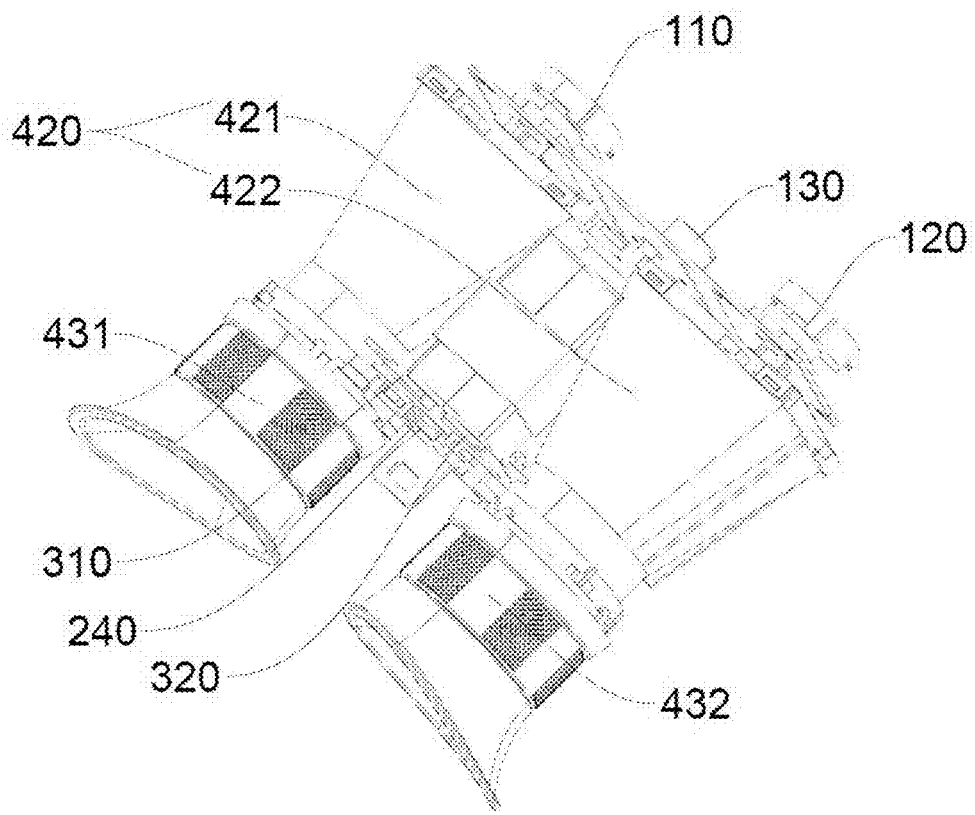
FIG. 4 is a schematic view of the naked-eye three-dimensional VR camera of the present disclosure.
Figure 5:
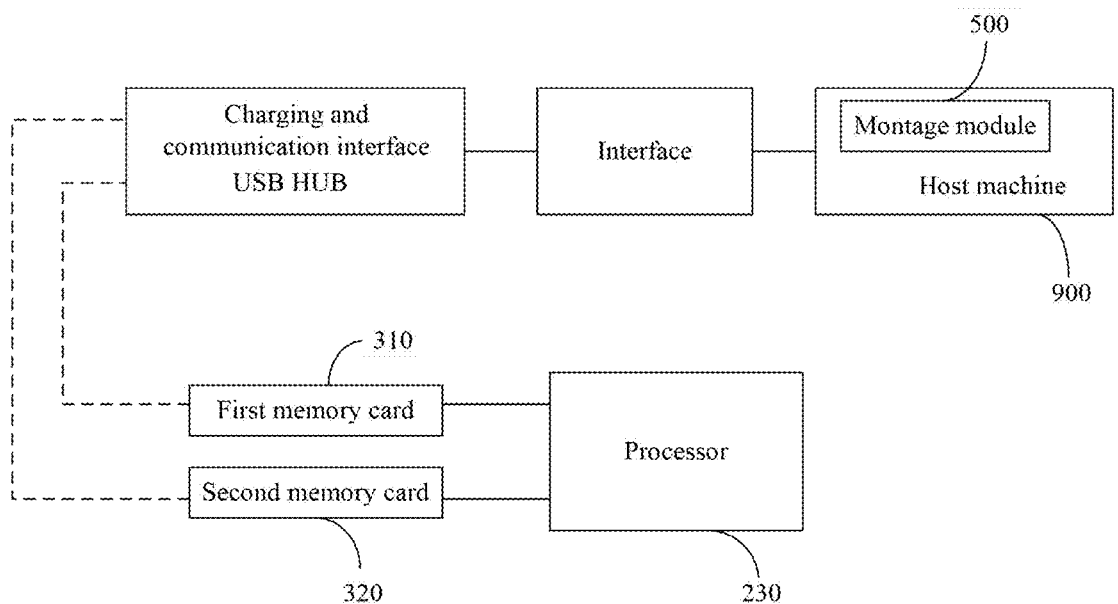
FIG. 5 is a schematic view of a montage module installed outside the naked-eye three-dimensional VR camera of the present disclosure.

Referring to FIG. 3, a difference between the third embodiment and each of the first embodiment and the second embodiment is that the control member 200 is dual processors, that is, the control member 200 includes a first processor 210 and a second processor 220. The memory card assembly 300 includes a first memory card 310 and a second memory card 320. The display component 400 includes a first display screen 412 and a second display screen 413.

Specifically, the speaker assembly 800 is dual speakers, namely the first speaker 810 and the second speaker 820, and the microphone (MIC) member 700 can be dual microphones, namely the first microphone 710 and the second microphone 720.

The first processor 210 is connected to the first memory card 310, the first MIC 710, the first speaker 810, the first lens module 110 and the first display screen 412. The second processor 220 is connected to the second memory card 320, the second MIC 720, the second speaker 820, the second lens module 120 and the second display screen 413. All of the power module 270, the drive circuit 131, the operation panel 260, the distance sensor 250, and a USB-HUB 241 are arranged between the first processor 210 and the second processor 220. The drive circuit 131 is electrically connected to the supplementary light module 130, and the USB-HUB 241 is connected to the interface 240.

The first image 610 that is captured by the first lens module 110 alone or by the first lens module 110 and the supplementary light module 130 is controlled and processed by the first processor 210 to be displayed on the first display screen 412 and stored in the first memory card 310. The second image 620 that is captured by the second lens module 120 alone or by the second lens module 120 and the supplementary light module 130 is controlled and processed by the second processor 220 to be displayed on the second display screen 413 and stored in the second storage card 320.

Figure 6:
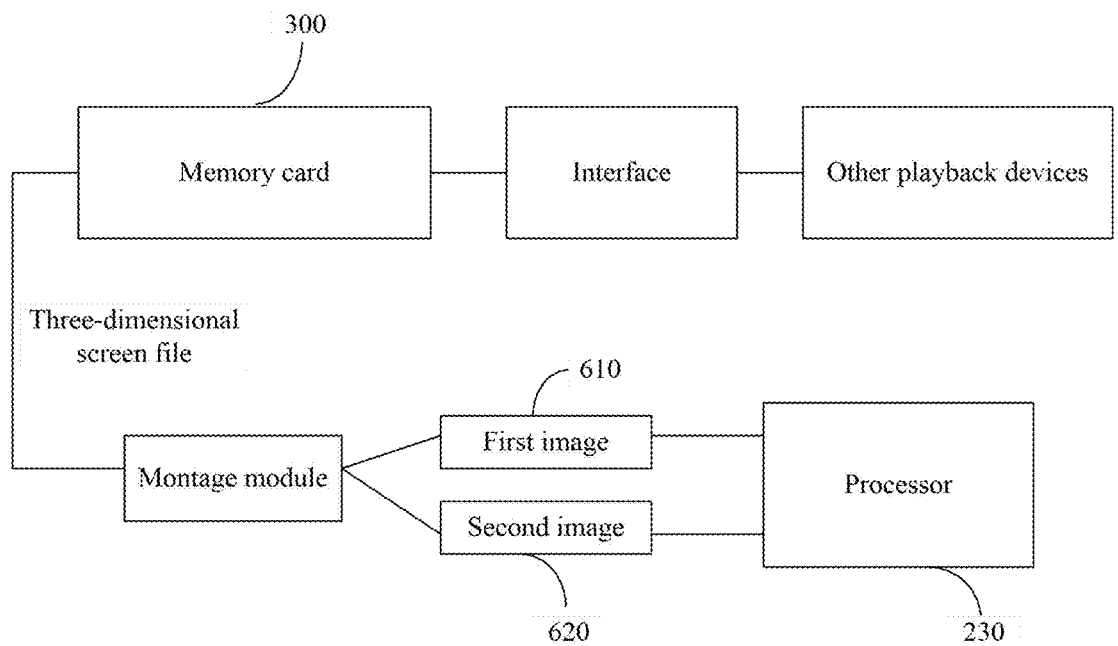
FIG. 6 is a schematic view of the montage module installed inside the naked-eye three-dimensional VR camera of the present disclosure.

Referring to FIG. 6, the montage module 500 is externally installed, which means that the montage module 500 is installed on other devices (such as a host machine 900), such as personal a personal computer (PC), a mobile terminal, or a montage device that is specially designed. The montage module 500 is coupled inside the host machine 900. The host machine 900 can communicate and connect with the first processor 210 and the second processor 220 through the interface 240, that is, both the first processor 210 and the second processor 220 are jointly connected to the interface 240. The host machine 900 is connected to the interface 240 through a data wire and reads data from the first memory card 310 and the second memory card 320. Alternatively, the first memory card 310 and the second memory card 320 inside the memory card assembly 300 can be removed and then assembled onto the host machine 900 that is connected to the montage module 500, that is, there are slots are provided on the host machine 900 to be engaged with the first memory card 310 and the second memory card 320. The host machine 900 reads the files of the first image 610 and the second image 620 that are stored in the memory card 300 through the interface 240 and the USB HUB 241, and then splices he first image 610 and the second image 620 through the montage module 500.

Preferably, the interface 240 is a TYPE-C interface.

In summary, the naked-eye three-dimensional VR camera of the present invention is provided that both the first lens module and the second lens module are arranged at intervals of a pupil distance to simulate human eyes and form the pupil distance difference between the first image and the second image that are captured. When the first image through one eye and the second image through the other eye are observed from the eyepiece member, a naked-eye three-dimensional effect can be directly formed. The montage module is connected to the control member or the memory card assembly to read files of the first and second images, and splice the first and second images according to a file name, a format and a time axis. Because the first image and the second image are synchronously captured, so that the first image and the second image are combined to form a three-dimensional image file with the pupil distance difference, thereby the images that are captured can be played on other naked-eye three-dimensional devices (such as VR glasses, VR helmets).

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A naked-eye three-dimensional VR camera comprising:
   a lens module comprising a first lens and a second lens arranged at intervals according to a pupil distance thereof, and a supplementary light module; the first lens module configured to capture a first image or cooperatively combined with the supplementary light module to capture the first image, the second lens module configured to capture a second image or cooperatively combined with the supplementary light module to capture the second image, and both the first lens module and the second lens module operated synchronously;
   a control member electrically connected to each of the first lens module, the second lens module and the supplementary light module;
   a memory card assembly electrically connected to the control member;
   an observation module comprising a display component, an observation member and an eyepiece member sequentially connected, the control member configured to control the display component to display the first image and the second image side by side, the eyepiece member configured to observe the first image and the second image through the observation member, to form a naked-eye three-dimensional effect thereof; and wherein
   the naked-eye three-dimensional VR camera further comprises a montage module installed inside the naked-eye three-dimensional VR camera or outside the naked-eye three-dimensional VR camera, the montage module configured to perform data analysis and comparison on the first image and the second image according to a file name, a format and a time axis, and then splice the first image and the second image that has been analyzed and compared side by side to form a three-dimensional image file with a pupil distance disparity; wherein the memory card assembly is configured to store the first image and the second image or store the three-dimensional image file that has been spliced.

2. The naked-eye three-dimensional VR camera as claimed in claim 1, wherein the eyepiece member comprises a first eyepiece and a second eyepiece, and the observation member comprises a first observation chamber and a second observation chamber isolated from each other, the first eyepiece configured to observe the first image through the first observation chamber, and the second eyepiece configured to observe the second image through the second observation chamber.

3. The naked-eye three-dimensional VR camera as claimed in claim 1, wherein the control member comprises a first processor and a second processor, the montage module installed outside the naked-eye three-dimensional VR camera, the memory card assembly comprises a first memory card and a second memory card, the first memory card electrically connected to the first processor and configured to store the first image, the second memory card electrically connected to the second processor and configured to store the second image.

4. The naked-eye three-dimensional VR camera as claimed in claim 3, wherein the display component comprises a first display screen and a second display screen, all the first lens module, the first display screen and the first processor electrically connected, and all the second lens module, the second display screen and the second processor electrically connected, the first display screen configured to display the first file and the second display screen configured to display the second image.

5. The naked-eye three-dimensional VR camera as claimed in claim 3, wherein the display component is a single display screen and configured to simultaneously display the first and second images under a control of the control component.

6. The naked-eye three-dimensional VR camera as claimed in claim 3, wherein the naked-eye three-dimensional VR camera further comprises a microphone (MIC) member and a speaker assembly, wherein the microphone member comprises a first MIC and a second MIC, and the speaker assembly comprises a first speaker and a second speaker, both the first MIC and the first speaker electrically connected to the first processor and both the second MIC and the second speaker electrically connected to the second processor.

7. The naked-eye three-dimensional VR camera as claimed in claim 3, wherein the camera further comprises a power module electrically connected to both the first processor and the second processor.

8. The naked-eye three-dimensional VR camera as claimed in claim 3, wherein the montage module is coupled to a host machine that comprises slots engaged with the first memory card and the second memory card, respectively.

9. The naked-eye three-dimensional VR camera as claimed in claim 8, wherein both the first processor and the second processor are jointly connected to an interface, the host machine connected to the interface through a data wire and reading data from the first and second memory cards.

10. The naked-eye three-dimensional VR camera as claimed in claim 1, wherein the control member comprises a single processor, all the first lens module, the memory card assembly and the display component electrically connected to the single processor.

11. The naked-eye three-dimensional VR camera as claimed in claim 10, wherein the montage module is built-in in the naked-eye three-dimensional VR camera and electrically connected to the control member, the memory card assembly comprising a single memory card, and the montage module configured to synthesize the first and second images into the three-dimensional image file and store in the single memory card.

12. The naked-eye three-dimensional VR camera as claimed in claim 10, wherein the display component is a single display screen configured to simultaneously display the first image and the second image under the control of the control member.

13. The naked-eye three-dimensional VR camera as claimed in claim 10, wherein the display component comprises a first display screen and a second display screen arranged side by side, the control member configured to control the first display screen to display the first image, and control the second display screen to display the second image.

14. The naked-eye three-dimensional VR camera as claimed in claim 10, wherein the camera further comprises a microphone (MIC) member and a speaker assembly electrically connected to the single processor, respectively.

15. The naked-eye three-dimensional VR camera as claimed in claim 14, wherein the microphone member is a single microphone, and the speaker assembly is a single speaker, both the single microphone and the single speaker electrically connected to the single processor.

16. The naked-eye three-dimensional VR camera as claimed in claim 14, wherein the microphone comprises a first MIC and a second MIC, and the speaker assembly comprises a first speaker and a second speaker, all the first MIC, the second MIC, the first speaker and the second speaker electrically connected to the single processor.

17. The naked-eye three-dimensional VR camera as claimed in claim 10, wherein the camera further comprises a power module electrically connected to the single processor.

* * * * *